United States Patent
Kuo et al.

(10) Patent No.: US 9,007,089 B2
(45) Date of Patent: Apr. 14, 2015

(54) INTEGRATED CIRCUIT DESIGN PROTECTING DEVICE AND METHOD THEREOF

(71) Applicant: eMemory Technology Inc., Hsin-Chu (TW)

(72) Inventors: Tung-Cheng Kuo, Hsinchu (TW); Sheng-Kai Chen, Taichung (TW)

(73) Assignee: eMemory Technology Inc., Hsinchu Science Park, Hsin-Chu (TW)

( * ) Notice: Subject to any disclaimer, the term of this patent is extended or adjusted under 35 U.S.C. 154(b) by 114 days.

(21) Appl. No.: 13/875,290

(22) Filed: May 2, 2013

(65) Prior Publication Data
US 2014/0111245 A1    Apr. 24, 2014

Related U.S. Application Data

(60) Provisional application No. 61/716,608, filed on Oct. 21, 2012.

(51) Int. Cl.
| | | |
|---|---|---|
| H03K 19/00 | (2006.01) | |
| H03K 17/00 | (2006.01) | |
| H01L 23/00 | (2006.01) | |
| G06F 21/75 | (2013.01) | |
| G06F 21/76 | (2013.01) | |

(52) U.S. Cl.
CPC ............ H01L 23/576 (2013.01); G06F 21/75 (2013.01); G06F 21/76 (2013.01); G06F 2221/2123 (2013.01)

(58) Field of Classification Search
USPC ....................... 326/8, 40, 46; 327/407, 408
See application file for complete search history.

(56) References Cited

U.S. PATENT DOCUMENTS

2006/0139054 A1 * 6/2006 Madurawe ............... 326/40

* cited by examiner

*Primary Examiner* — Daniel D Chang
(74) *Attorney, Agent, or Firm* — Winston Hsu; Scott Margo

(57) ABSTRACT

An integrated circuit design protecting device includes a switch device and a non-volatile memory. The switch device includes M input ports, N output ports, N multiplexers, and S selection nodes. Each multiplexer of the N multiplexers includes I input nodes, an output node, and at least one selection node. The I input nodes are coupled to I input ports of the M input ports. The output node is coupled to an output port of the N output ports. The non-volatile memory is coupled to the S selection nodes of the switch device for providing selection codes to the switch device.

15 Claims, 6 Drawing Sheets

US 9,007,089 B2

INTEGRATED CIRCUIT DESIGN PROTECTING DEVICE AND METHOD THEREOF

CROSS REFERENCE TO RELATED APPLICATIONS

This application claims the benefit of U.S. Provisional Application No. 61/716,608, which was filed on Oct. 21, 2012 and entitled "Invisible Electrical Connections".

BACKGROUND OF THE INVENTION

1. Field of the Invention

The invention is related to a device in an integrated circuit, and more particularly, to a device in an integrated circuit for protecting the integrated circuit design.

2. Description of the Prior Art

As outsourcing integrated circuit (IC) manufacturing becomes an economic trend, most IC design companies outsource their IC manufacturing to third party manufactures. However doing so may increase the difficulty of protecting the intellectual property (IP) of IC designs and may cause tremendous loss to the IC design companies. Further, pirated ICs are more likely to be defective, which might put people's lives in danger if those pirated ICs are used in critical equipment. Moreover, national security might be breached if ICs used in military equipment are reverse-engineered by potential enemies.

One way to reverse-engineer ICs may be through decapsulation (DECAP), which is common in related industry. Therefore, it is important to figure out a way to protect ICs from being copied or at least to increase difficulty for others to reverse-engineer ICs in order to protect IP of IC designs.

SUMMARY OF THE INVENTION

An embodiment of the present invention discloses an integrated circuit design protecting device. The device comprises a switch device and a non-volatile memory. The switch device comprises M input ports, N output ports, N multiplexers, and S selection nodes. Each of the N multiplexers comprises I input nodes, an output node, and at least one selection node. The I input nodes are coupled to I input ports of the M input ports. The output node is coupled to one of the N output ports. The non-volatile memory is coupled to the S selection nodes of the switch device for providing selection codes to the switch device. Where M≥N≥1, and M, N, I and S are positive integers.

Another embodiment of the present invention discloses an integrated circuit design protecting method. The method firstly configure first circuitry and second circuitry in an integrated circuit. Then simulate functions of the first circuitry and the second circuitry. Place and route the first circuitry and the second circuitry. Correspond connection ports of the first circuitry with connection ports of the second circuitry. Dispose an integrated circuit design protecting device which comprises a switch device and a non-volatile memory between the first circuitry and the second circuitry. Wherein the switch device comprises a plurality of multiplexers coupled to the non-volatile memory. Generate selection codes to be inputted to the multiplexers. Link the selection codes to the multiplexers. Generate layout files. Process the integrated circuit according to the layout files. Program the selection codes in the non-volatile memory. Bond and package the integrated circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
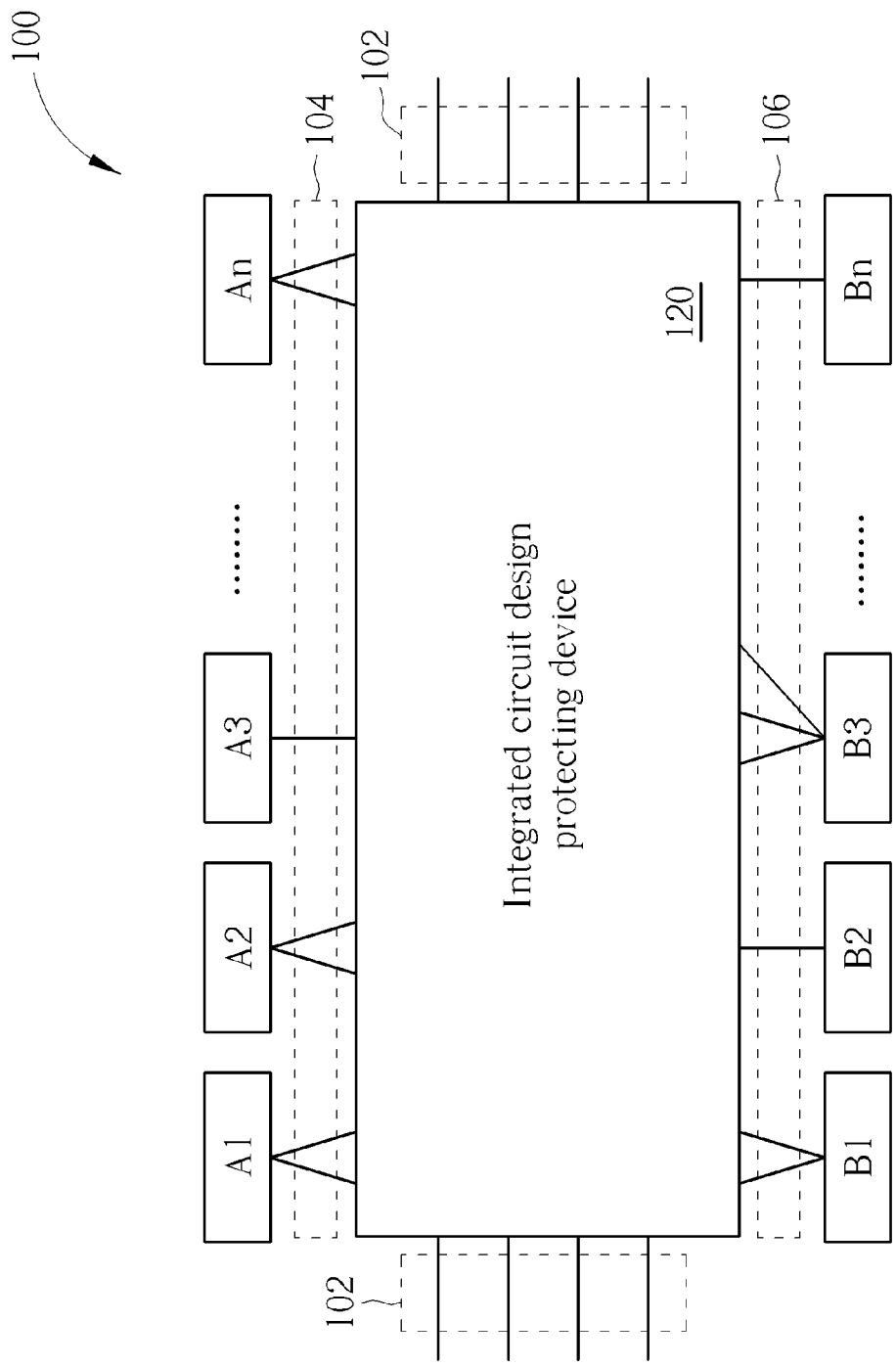
FIG. 1 is a block diagram illustrating an integrated circuit according to an embodiment of the present invention.
Figure 2:
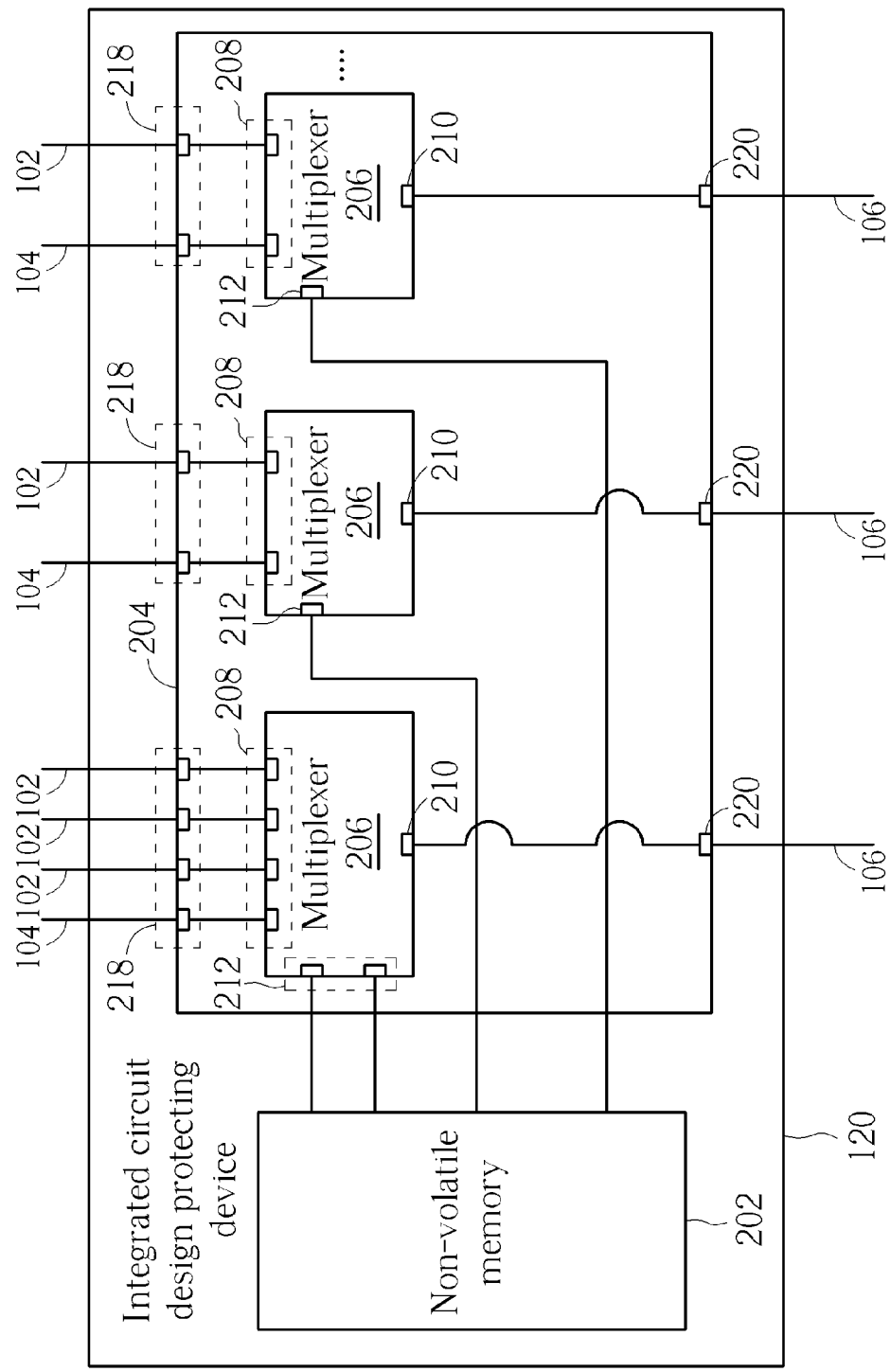
FIG. 2 is a block diagram illustrating the integrated circuit design protecting device of FIG. 1 according to an embodiment of the present invention.

Please refer to both FIG. 1 and FIG. 2. FIG. 1 is a block diagram illustrating an integrated circuit 100 according to an embodiment of the present invention. The integrated circuit 100 may include a plurality of circuit blocks A1 to An and B1 to Bn, an integrated circuit design protecting device 120, a plurality of dummy input connections 102, a plurality of true input connections 104, and a plurality of true output connections 106. The integrated circuit design protecting device 120 is used to connect at least one of the circuit blocks A1 to An to corresponding blocks of the circuit blocks B1 to Bn through the plurality of true input connections 104 and the plurality of true output connections 106 based on how the integrated circuit design protecting device 120 is programmed. The integrated circuit design protecting device 120 is also coupled to the plurality of dummy input connections 102.

FIG. 2 is a block diagram illustrating the integrated circuit design protecting device 120 of FIG. 1 according to an embodiment of the present invention. The integrated circuit design protecting device 120 may include a non-volatile memory 202 and a switch device 204. The switch device 204 may have M input ports 218 and N output ports 220, and may include N multiplexers 206. Each multiplexer 206 may have I input nodes 208, an output node 210, and at least one selection node 212. The total number of selection nodes 212 of the N multiplexers 206 is S. The non-volatile memory 202 is coupled to selection nodes 212 of each multiplexer 206. M, N, I and S are positive integers and M≥N≥1. For brevity, only three multiplexers 206 are shown in FIG. 2, but the invention is not limited thereto, there may be N multiplexers 206 in the switch device 204. Take the leftmost multiplexer 206 for example and supposing M=8, N=3, I=4, and the leftmost multiplexer 206 has two selection nodes 212. 4 input nodes 208 of the leftmost multiplexer 206 are coupled to 4 input ports 218 among 8 inputs ports 218 of the switch device 204 and only one input node 208 of the 4 input nodes 208 is coupled to one of the true input connections 104 whereas remaining three input nodes 208 of the 4 input nodes 208 are coupled to the dummy input connections 102. The output node 210 of the leftmost multiplexer 206 is coupled to 1 output port 220 among 3 output ports 220 of the switch device 204. The two selection nodes 212 of the leftmost multiplexer 206 are coupled to the non-volatile memory 202 for receiving a selection code from the non-volatile memory 202.

Each connection of the selection node may indicate one bit of the selection codes and since two selection nodes 212 of the leftmost multiplexer 206 are coupled to the non-volatile memory 202, the multiplexer 206 may receive a 2-bit selection code from the non-volatile memory 202. For example if the 2-bit selection code is '00', a signal at the leftmost input node 208 of the multiplexer 206 may be outputted to the output node 210 of the multiplexer 206 to be the signal at the true output connection 106 so as to establish an electrical connection between one of the circuit blocks A1 to An to a corresponding block of the circuit blocks B1 to Bn, whereas signals at the dummy input connections 102 are not outputted. Further the non-volatile memory 202 may be programmed to store a selection code for each multiplexer 206 so as to control each multiplexer 206 through selection nodes 212 of each multiplexer 206 to select signals at the true input connections 104 to be signals at the true output connections 106 while ignoring signals at the dummy input connections 102 of each multiplexer 206. Therefore N input ports 218 of M input ports 218 of the switch device 204 are electrically connected to the true input connections 104 for outputting signals at the true input connections 104 to the true output connections 106, which are coupled to the N output ports 220. The other (M−N) input ports 218 of the switch device 204 are dummy input ports coupled to the dummy input connections 102, which are not used to deliver signals in the integrated circuit 100.

The non-volatile memory 202 may be programmed to store the selection codes using floating gate technology or using antifuse switch technology. Once pirate manufacturers hardly access the stored selection codes, the IC can not easily be copy and thus be secured.

As illustrated in FIG. 1 and FIG. 2, only IC designers know which connections coupled to the integrated circuit design protecting device 120 are the true input connections 104 and should be outputted to the true output connections 106 in order to couple the circuit blocks A1 to An to the corresponding circuit blocks B1 to Bn. The IC designers may program the selection codes to the non-volatile memory 202 so that the real connections in the integrated circuit 100 can not be reverse engineered because there is no way to know which connections of the circuit blocks A1 to An are corresponding to which connections of the circuit blocks B1 to Bn without knowing the selection codes. Therefore design of the integrated circuit 100 is protected.

Figure 3A:
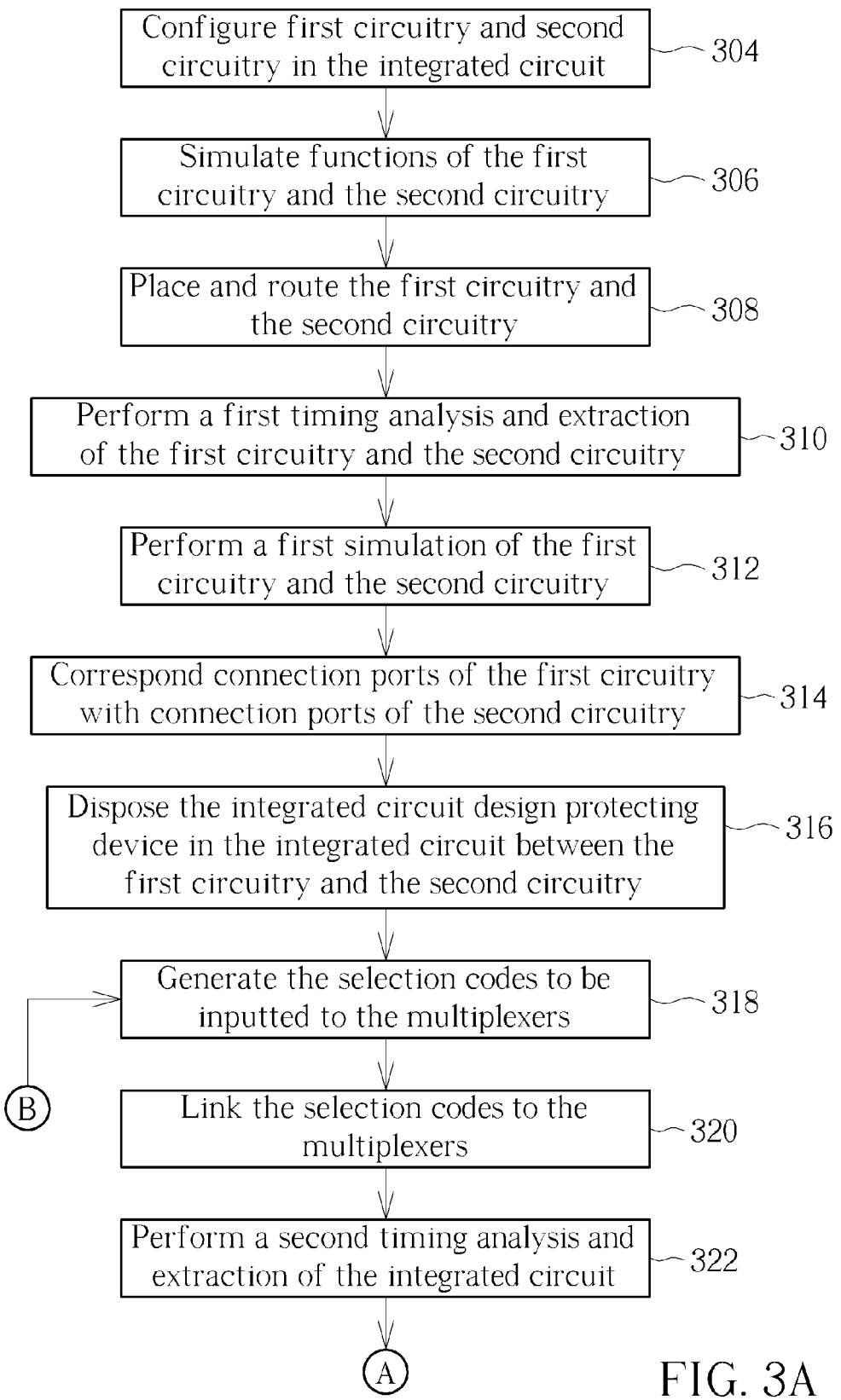
FIGS. 3A and 3B are flowcharts illustrating a method for protecting the integrated circuit of FIG. 1 according to an embodiment of the present invention.
Figure 3B:
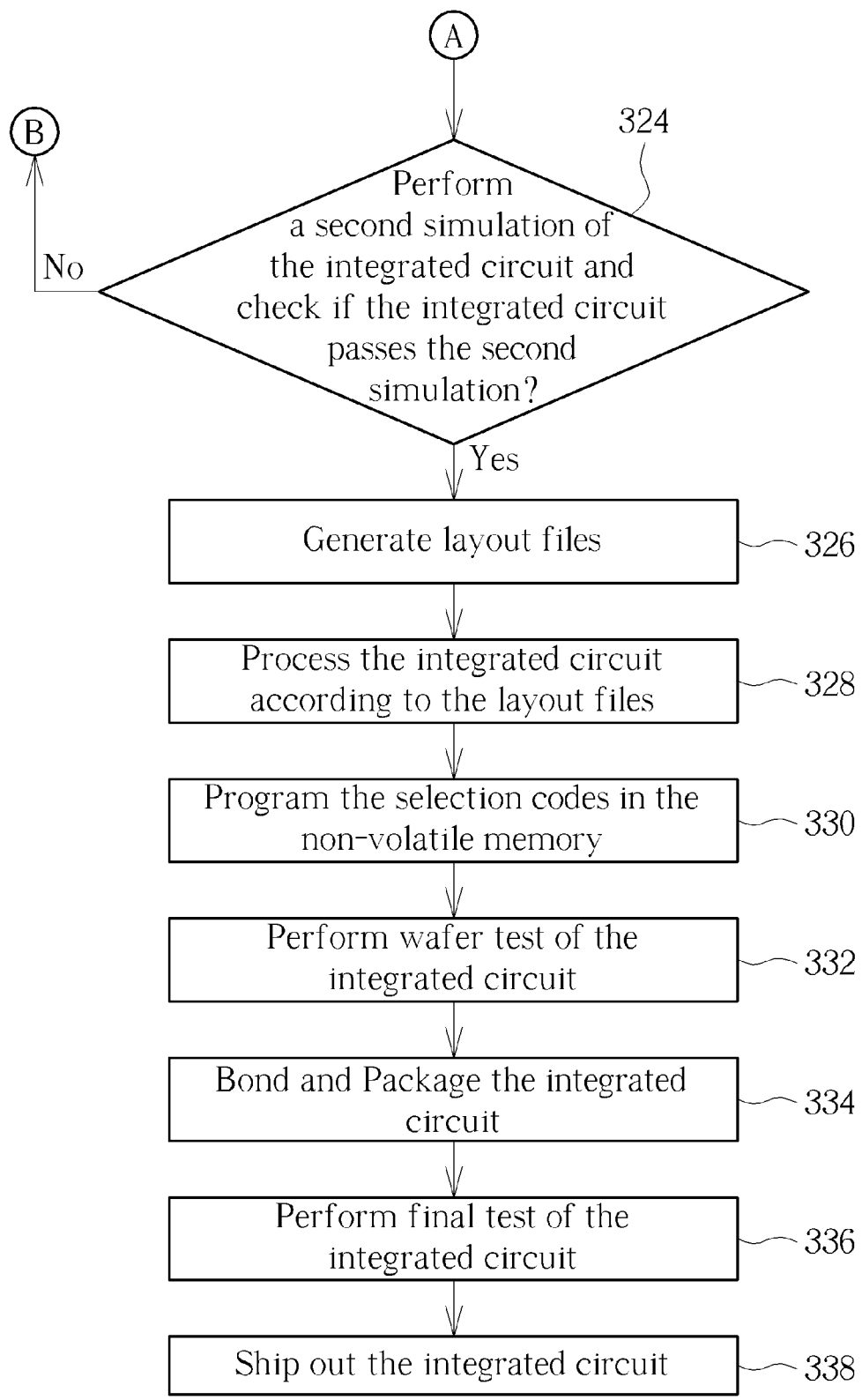

FIG. 3A and FIG. 3B are flowcharts illustrating a method 300 for protecting the integrated circuit 100 of FIG. 1 according to an embodiment of the present invention. The method 300 may include following steps.

Step 304: Configure first circuitry and second circuitry in the integrated circuit 100.
Step 306: Simulate functions of the first circuitry and the second circuitry.
Step 308: Place and route the first circuitry and the second circuitry.
Step 310: Perform a first timing analysis and extraction of the first circuitry and the second circuitry.
Step 312: Perform a first simulation of the first circuitry and the second circuitry.
Step 314: Correspond connection ports of the first circuitry with connection ports of the second circuitry.
Step 316: Dispose the integrated circuit design protecting device 120 in the integrated circuit 100 between the first circuitry and the second circuitry.
Step 318: Generate the selection codes to be inputted to the multiplexers 206.
Step 320: Link the selection codes to the multiplexers 206.
Step 322: Perform a second timing analysis and extraction of the integrated circuit 100.
Step 324: Perform a second simulation of the integrated circuit 100 and check if the integrated circuit 100 passes the second simulation; if so, perform step 326; else perform step 318.
Step 326: Generate layout files.
Step 328: Process the integrated circuit 100 according to the layout files.
Step 330: Program the selection codes in the non-volatile memory 202.
Step 332: Perform wafer test of the integrated circuit 100.
Step 334: Bond and Package the integrated circuit 100.
Step 336: Perform final test of the integrated circuit 100.
Step 338: Ship out the integrated circuit 100.

The first circuitry of the method 300 may be referred to the circuit blocks A1 to An and the second circuitry of the method 300 maybe referred to the circuit blocks B1 to Bn in FIG. 1. The IC designers design and configure the first circuitry and the second circuitry in step 304. Place and route the first circuitry and the second circuitry in step 308 may be performed by electronic design automation (EDA) tools. In step 314, either the IC designers may decide and select the corresponding connections or the EDA tools may assist the IC designers to select the corresponding connections between ports of the first circuitry and ports of the second circuitry. Next in step 316, the integrated circuit design protecting device 120 is disposed and inserted between the first circuitry and the second circuitry. Then in step 318 and 320, the selection codes are inputted by the IC designers or generated by the EDA tools and are linked to circuit simulation as post simulation constraint used in steps 322 and 324. If the selection codes generated and inputted to the multiplexers 206 in step 318 are correct, the integrated circuit 100 may pass the post simulation in step 324, otherwise the integrated circuit 100 may fail the post simulation and steps 318, 320, 322, 324 should be re-performed. The layout files in step 326 may be GDS II files. In step 328 the integrated circuit 100 is processed for manufacturing. In step 330 the IC designers actually program the selection codes in the non-volatile memory 202 at this stage, that is to say, the selection codes may be programmed after the integrated circuit 100 has been manufactured so that even the third party manufacture does not know the selection codes for the corresponding connections, which greatly protects the integrated circuit 100 from being illegally pirated. In this embodiment, steps 310 and 312 may be optionally omitted, and only steps 322 and 324 performing timing analysis, extraction and simulation of the integrated circuit are executed.

Figure 4A:
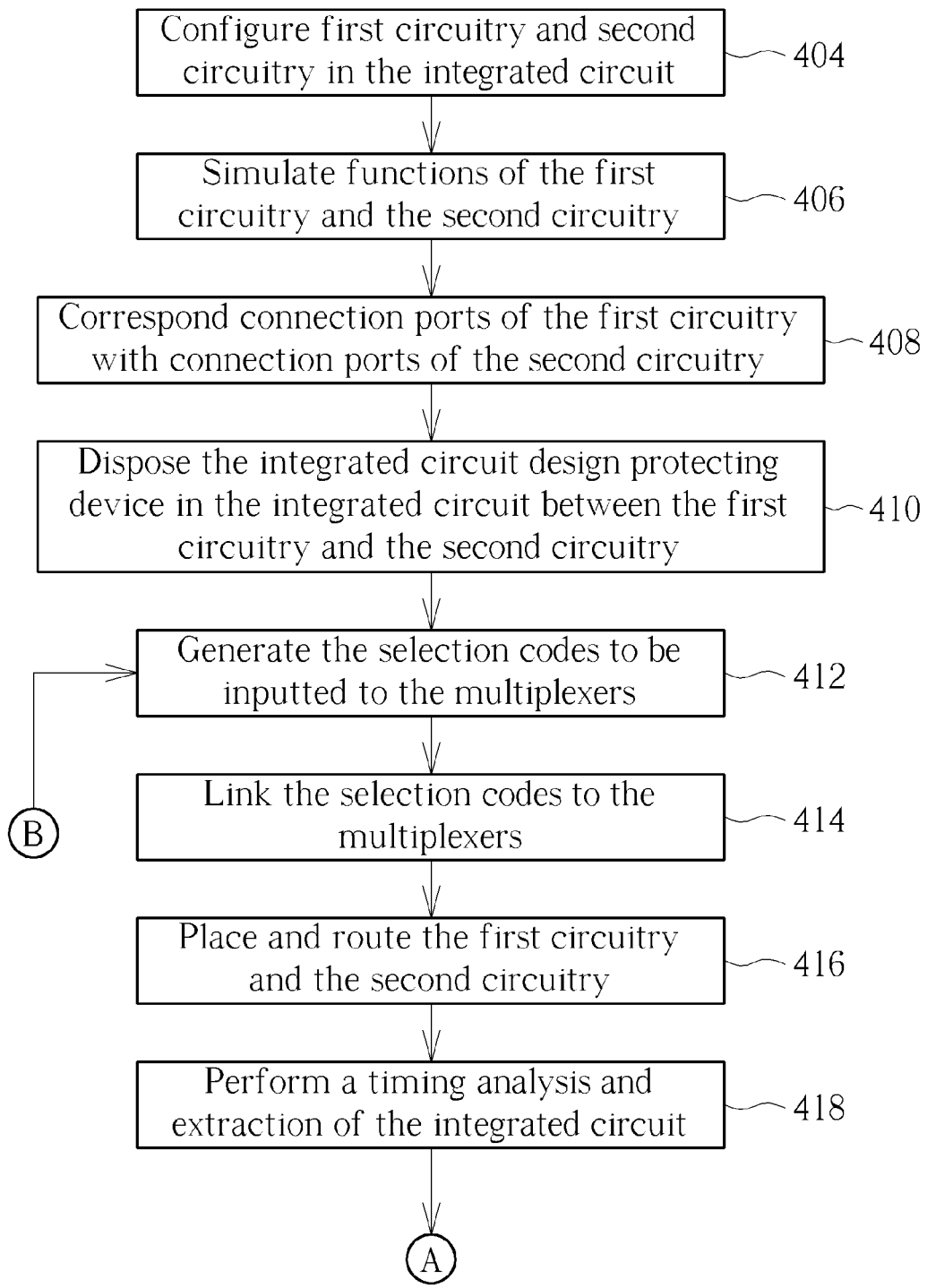
FIGS. 4A and 4B are flowcharts illustrating a method for protecting the integrated circuit of FIG. 1 according to another embodiment of the present invention.
Figure 4B:
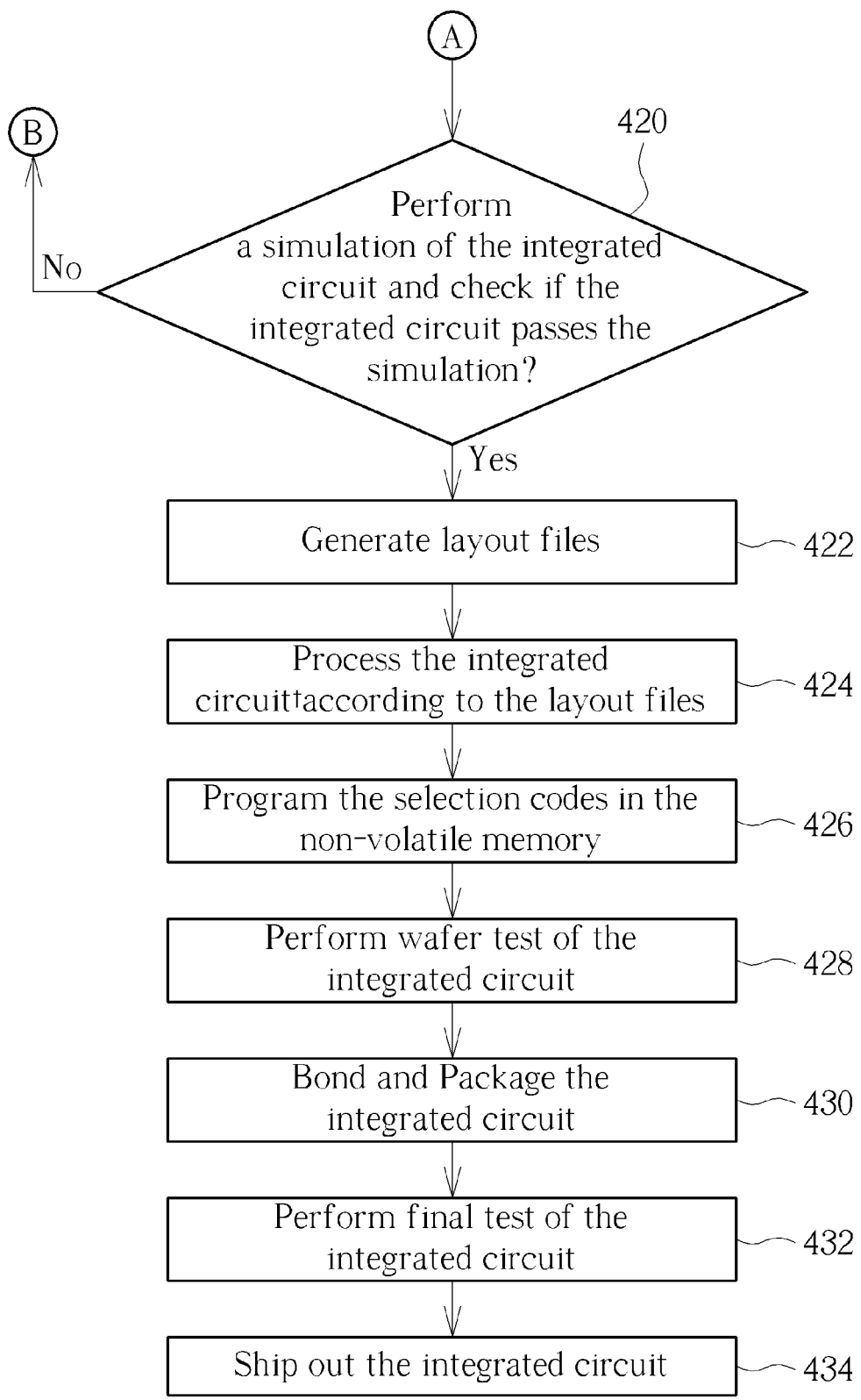

FIG. 4A and FIG. 4B are flowcharts illustrating a method 400 for protecting the integrated circuit 100 of FIG. 1 according to another embodiment of the present invention. The method 400 may include the following steps.

Step 404: Configure first circuitry and second circuitry in the integrated circuit 100.
Step 406: Simulate functions of the first circuitry and the second circuitry.
Step 408: Correspond connection ports of the first circuitry with connection ports of the second circuitry.
Step 410: Dispose the integrated circuit design protecting device 120 in the integrated circuit 100 between the first circuitry and the second circuitry.
Step 412: Generate the selection codes to be inputted to the multiplexers 206.
Step 414: Link the selection codes to the multiplexers 206.
Step 416: Place and route the first circuitry and the second circuitry.
Step 418: Perform a timing analysis and extraction of the integrated circuit 100.

Step 420: Perform a simulation of the integrated circuit 100 and check if the integrated circuit 100 passes the simulation; if so, perform step 422; else perform step 412.

Step 422: Generate layout files.

Step 424: Process the integrated circuit 100 according to the layout files.

Step 426: Program the selection codes in the non-volatile memory 202.

Step 428: Perform wafer test of the integrated circuit 100.

Step 430: Bond and Package the integrated circuit 100.

Step 432: Perform final test of the integrated circuit 100.

Step 434: Ship out the integrated circuit 100.

In FIG. 4A and FIG. 4B, the EDA tools may integrate functions and support workflows to perform steps 408 to 420 in addition to place and route functions. Steps 418 and 420 may be performed as post simulation of the integrated circuit 100. If the selection codes generated and inputted to the multiplexers 206 in step 412 are correct, the integrated circuit 100 may pass the post simulation in step 420, otherwise the integrated circuit 100 may fail the post simulation and steps 412, 414, 418, 420 should be re-performed.

In summary, the present invention discloses integrated circuit design protecting device and method that may protect intellectual property of IC design by storing selection codes in the non-volatile memory, in this way, only the IC designers know the selection codes to correctly connect the corresponding connections between circuit blocks in the integrated circuit and even the third party manufactures may not know the selection codes because these may be programmed after the integrated circuit has been manufactured. Further, if someone tries to DECAP the integrated circuit, he may be deceived by dummy input connections and know nothing about actually connections between circuit blocks without knowing the selection codes in the non-volatile memory. This indeed improves design and manufacturing security of IC and prevents IC design from being illegally copied or pirated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated circuit design protecting device comprising:
    a switch device comprising:
        M input ports comprising N true input ports and (M-N) dummy input ports;
        N output ports;
        N multiplexers, each multiplexer of the N multiplexers comprising:
            I input nodes coupled to I input ports of the M input ports;
            an output node coupled to an output port of the N output ports; and
            at least one selection node; and
        S selection nodes; and
    a non-volatile memory coupled to the S selection nodes of the switch device for providing selection codes to the switch device;
    wherein M≥N≥1, and M, N, I and S are positive integers.

2. The device of claim 1 wherein the non-volatile memory is coupled to the at least one selection node of each of the N multiplexer.

3. The device of claim 1 wherein the selection codes are stored in the non-volatile memory using floating gate technology.

4. The device of claim 1 wherein the selection codes are stored in the non-volatile memory using antifuse switch technology.

5. An integrated circuit design protecting method comprising:
    configuring first circuitry and second circuitry in an integrated circuit;
    simulating functions of the first circuitry and the second circuitry;
    placing and routing the first circuitry and the second circuitry;
    corresponding connection ports of the first circuitry with connection ports of the second circuitry;
    disposing an integrated circuit design protecting device in the integrated circuit between the first circuitry and the second circuitry, the integrated circuit design protecting device comprising a switch device and a non-volatile memory, the switch device comprising a plurality of multiplexers coupled to the non-volatile memory;
    generating selection codes to be inputted to the multiplexers;
    linking the selection codes to the multiplexers;
    generating layout files;
    processing the integrated circuit according to the layout files;
    programming the selection codes in the non-volatile memory; and
    bonding and packaging the integrated circuit.

6. The method of claim 5 further comprising:
    performing a timing analysis and extraction after placing and routing the first circuitry and the second circuitry.

7. The method of claim 6 further comprising:
    performing a simulation of the first circuitry and the second circuitry after performing the timing analysis and extraction.

8. The method of claim 5 further comprising:
    performing a timing analysis and extraction after linking the selection codes to the multiplexers.

9. The method of claim 8 further comprising:
    performing a simulation of the first circuitry and the second circuitry after performing the timing analysis and extraction.

10. The method of claim 5 wherein programming the selection codes in the non-volatile memory comprises:
    programming the selection codes in the non-volatile memory using floating gate technology.

11. The method of claim 5 wherein programming the selection codes in the non-volatile memory comprises:
    programming the selection codes in the non-volatile memory using antifuse switch technology.

12. The method of claim 5 wherein placing and routing the first circuitry and the second circuitry is performed before corresponding connection ports of the first circuitry with connection ports of the second circuitry.

13. The method of claim 5 wherein placing and routing the first circuitry and the second circuitry is performed after linking the selection codes to the multiplexers.

14. The method of claim 5 further comprising:
    testing the integrated circuit after programming the selection codes in the non-volatile memory.

15. The method of claim 5 further comprising:
    testing the integrated circuit after bonding and packaging the integrated circuit.

* * * * *